Oct. 10, 1933.   J. C. CROWLEY   1,930,040
VALVE
Filed Jan. 19, 1932

INVENTOR:
JOHN C. CROWLEY.
ATTORNEYS.

Patented Oct. 10, 1933

1,930,040

UNITED STATES PATENT OFFICE 1,930,040

VALVE

John C. Crowley, Cleveland Heights, Ohio, assignor to The Dill Manufacturing Company, Cleveland, Ohio, a corporation of Ohio Application January 19, 1932. Serial No. 587,537

4 Claims. (Cl. 152—12)

This invention relates to a valve and particularly to a valve especially adapted for use with athletic balls and similar articles.

An object of the invention is to provide a valve for use with athletic balls and similar articles, which is compact, can be completely housed within the ball or article and which is efficient in operation.

Another object is to provide a valve of this character which is constructed, in the major part, of rubber or other resilient material and which may be incorporated in the ball or article as an integral part thereof.

A further object is to provide a valve of this character which is simple in construction and composed of relatively few parts and in which the resiliency of a portion of the valve itself maintains the valve in seated position, thus obviating the use of springs or other means for maintaining the valve seated.

Additional objects and advantages will become apparent hereinafter during the following detailed description of an embodiment of the invention which is to follow:

The embodiment of the invention to be described herein is illustrated in the accompanying drawing wherein.

The bladder of an athletic ball or other article is fragmentarily indicated at 10, such bladder being provided with an opening 11 to permit the assembly of the valve with the bladder.

Figure 1:
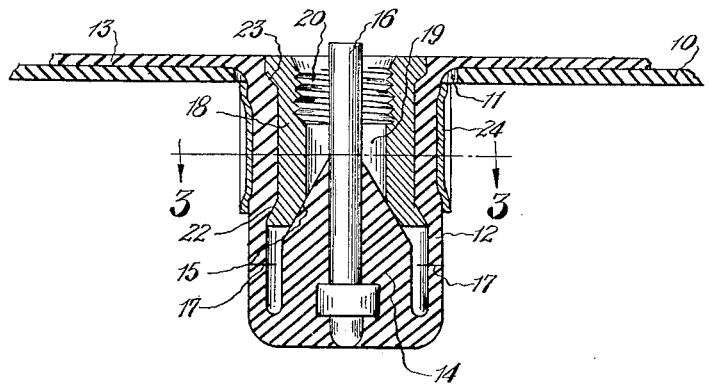
Figure 1 is an enlarged transverse longitudinal sectional view through the valve and shows the valve seated.
Figure 2:
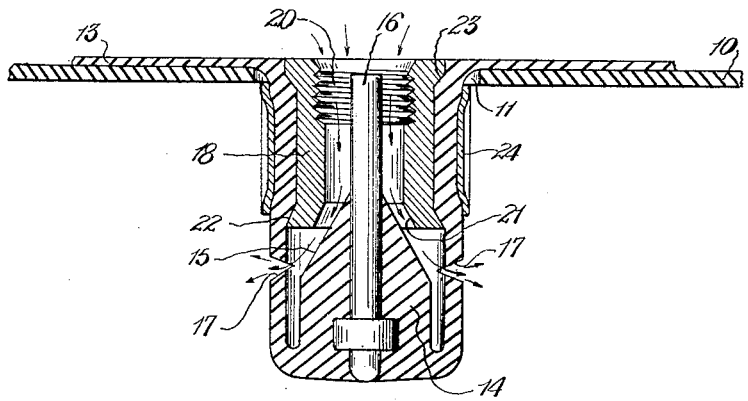
Fig. 2 is a view similar to Fig. 1, but shows the valve opened.
Figure 3:
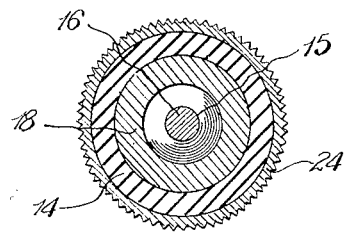
Fig. 3 is a sectional view taken substantially on line 3—3 of Fig. 1, looking in the direction of the arrows.

The valve comprises a cup-like member 12, that is a member having bottom and side walls and open at one end, formed of rubber or other resilient material, such member being inserted through the opening 11 and having at its outer end a relatively thin flange 13, which extends over the outer side of the bladder and is cemented thereto to integrally unite the bladder and valve. The cup-like member 12 is provided internally with an integral upwardly extending portion 14, the upper end of which is of conical shape, as indicated at 15. A valve pin 16 is molded into the portion 14 of a cup-like member 12 and extends upwardly in said member to a point adjacent the outer or open end thereof. The member 12 is provided in its side wall and adjacent the inner end thereof with one or more slits 17 which, when the valve pin 16 is depressed, open to allow the air to pass through the valve and into the ball or article upon which the valve is used. A metal insert 18 is arranged within the cup-like member 12 and adjacent the upper end thereof, said insert being provided with a bore 19, threaded at 20 to receive a pump coupling and having at its lower end a tapered counterbore 21, into which the conical end 15 of the portion 14 of the member 12 extends and upon which said conical end seats when the valve is closed. The insert 18 is held in position in the member 12 by means of tapered oppositely disposed shoulders 22 and 23 arranged at opposite ends of the insert, the cup-like member 12 being clamped against said shoulders by means of an external ferrule 24 arranged on the member 12 adjacent its outer end, which ferrule may be knurled or not as desired. It will be seen that when a pump coupling is attached to the insert 18 that the valve pin 16 will be depressed and the conical end 15 of the portion 14 unseated with respect to the tapered counterbore 21, while the slits 17 will open and air will then be free to pass through the valve and into the ball or article, as indicated by the arrows in Fig. 2. As soon as the ball or article has been inflated to the desired amount, the pump coupling is disconnected and the conical end 15 seats in the counterbore 21 in air-sealing relationship, while the slits 17 close, such seating of the conical end 15 and closing of the slits 17 being brought about mainly by the resiliency of the walls of the cup-like member 12 and partly by the pressure within the wall.

A valve, such as has been described and illustrated herein, will be seen to be extremely compact and, when mounted in a ball or other article, will be contained entirely within the same and will therefore offer no projecting parts upon the outer surface of the ball or article.

A further advantage of a valve of this character is that it is constructed substantially entirely of rubber or other suitable resilient material, there being a minimum number of metallic parts in the valve.

A most important advantage of a valve constructed in accordance with that illustrated herein is that a double seal is effected through the closing of the slits 17 and the seating of the conical end 15 of the portion 14 in the conical counterbore 21. In addition the air pressure within the inflated article will act to collapse the side walls of the member 12 inwardly against the sides of the portion 14 and thus provide an additional or greater sealing area.

Although a preferred form of the invention has been illustrated and described herein, it should be understood that the invention is susceptible of various modifications and adaptations within the scope of the appended claims. It should also be understood that by the term "cup-shaped" member, I mean a member having bottom and side walls and being open at one end.

Having thus described my invention, I claim:

1. A valve of the character described comprising a cup-shaped member formed of resilient material and having a normally closed slit in its side wall and being provided internally with a portion projecting outwardly from its bottom wall, said portion having a conical outer end and being provided with a valve pin, and an insert having a bore therethrough communicating with the interior of the member arranged in said member and provided at its inner end with a conical counterbore located outwardly of said slit in which said conical end of said portion normally seats.

2. A valve of the character described comprising a cup-shaped member formed of resilient material and having a normally closed slit in its side wall and being provided with a laterally extending flange at its outer end, said member having a portion projecting from its bottom wall interiorly thereof, said portion having a conical outer end and being provided with a valve pin, and an insert arranged in said member and having a bore therethrough communicating with the interior of the member outwardly of said slit and provided at its inner end with a conical counterbore in which said conical end of said portion normally seats.

3. A valve of the character described comprising a cup-shaped member formed of resilient material and having a normally closed slit in its side wall, means interiorly of said member arranged outwardly of said slit and having an opening therethrough and forming a seat, and means interiorly of said member projecting from its bottom wall and provided with a valve pin, said last named means having a portion complemental to said first named means and adapted to normally seat thereon.

4. A valve of the character described comprising a cup-shaped member formed of resilient material and having a normally closed slit in its side wall, means interiorly of said member arranged outwardly of said slit and having an opening therethrough and forming a seat, and means interiorly of said member projecting from its bottom wall and provided with a valve pin, said last named means having a portion complemental to said first named means and adapted to normally seat thereon and having a portion of its peripheral surface lying adjacent to, but spaced from the side wall of said member.

JOHN C. CROWLEY.